(No Model.)
W. F. STUART.
CARRIAGE TOP PROP.
No. 278,060. Patented May 22, 1883.
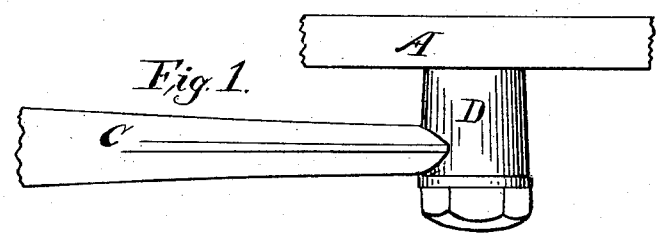
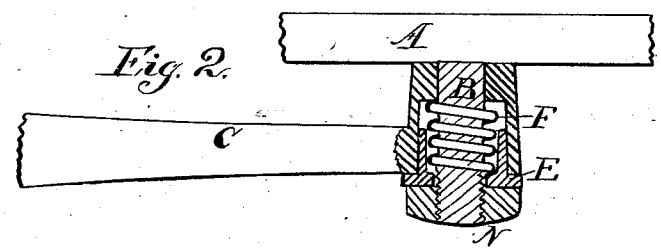
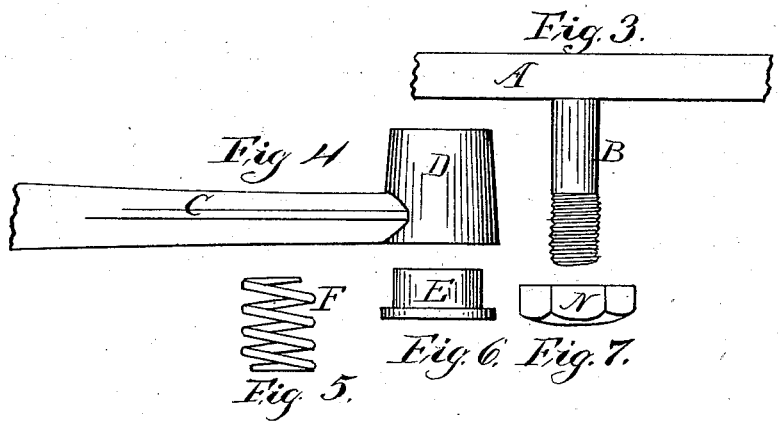
Witness,
M. G. Norton
John O. Talcott
Inventor,
William F. Stuart.
By Geo. W. Tibbitts Atty.

UNITED STATES PATENT OFFICE.

WILLIAM F. STUART, OF CLEVELAND, OHIO, ASSIGNOR OF ONE-HALF TO CHARLES E. J. LANG, OF SAME PLACE.

CARRIAGE-TOP PROP.

SPECIFICATION forming part of Letters Patent No. 278,060, dated May 22, 1883.

Application filed January 6, 1883. (No model.)

*To all whom it may concern:*

Be it known that I, WILLIAM F. STUART, of Cleveland, in the county of Cuyahoga and State of Ohio, have invented a new and useful Anti-Rattling Joint for Attaching Brace, Bow, and other Irons for Buggies and Wagons, of which the following is a specification.

My improvement consists in providing the end of the brace-iron with a recessed sleeve, to contain a spring and recessed washer surrounding the bolt supporting said brace, and secured together by a nut on the outer end of said bolt, the said parts being so constructed, combined, and operating that should the joint become worn, the spring will prevent rattling when the joint becomes loose.

In the accompanying drawings, Figure 1 is a side elevation of a brace end and its jointed connection. Fig. 2 is a sectional view of said joint. Figs. 3, 4, 5, 6, and 7, are detached views of the several parts comprising the said joint.

A is the iron located on the under side of the axle-tree, to which the king-bolt is attached, and is provided with a bolt, B.

C is a brace-iron supporting the reach of a buggy. The end of said iron is provided with a recessed sleeve, D, fitting on the said bolt. The recess is in the lower side of the sleeve, and terminates with a shoulder, leaving upper portion of the opening to fit closely on the bolt, as shown in section, Fig. 2.

E is a washer having a cup or recessed projection fitting up into the recess in the sleeve D.

F is a coil-spring surrounding the bolt and located within the recesses of the sleeve and washer, and bearing against the shoulder in the sleeve at upper end and against the washer at the lower end. N is a nut screwed onto projecting end of bolt, and secures all together, as seen in Figs. 1 and 2.

From the foregoing it will be seen that the bearing of the spring is such that in case the wearing-surfaces of the sleeve become loosened by constant motion the spring prevents rattling of the parts by jarring.

Having described my invention, I claim—

The combination of the bolt B, attached to the iron A, the recessed sleeve D on brace-iron C, the recessed washer E, the coil-spring F, and nut N, arranged and operating substantially as and for the purpose specified.

WILLIAM F. STUART.

Witnesses:
E. W. LAIRD,
GEO. W. TIBBITTS.